(12) United States Patent
Cooper

(10) Patent No.: US 10,775,211 B2
(45) Date of Patent: Sep. 15, 2020

(54) REAL-TIME VESSEL MONITORING SYSTEM

(71) Applicant: Quest Automated Services, LLC, Tulsa, OK (US)

(72) Inventor: Adam Cooper, Tulsa, OK (US)

(73) Assignee: Quest Automated Services, LLC, Tulsa, OK (US)

(*) Notice: Subject to any disclaimer, the term of this patent is extended or adjusted under 35 U.S.C. 154(b) by 215 days.

(21) Appl. No.: 15/970,579

(22) Filed: May 3, 2018

(65) Prior Publication Data
US 2018/0321066 A1 Nov. 8, 2018

Related U.S. Application Data

(60) Provisional application No. 62/500,575, filed on May 3, 2017.

(51) Int. Cl.
| | | |
|---|---|---|
| *G01F 1/00* | (2006.01) | |
| *G01F 5/00* | (2006.01) | |
| *G01F 23/00* | (2006.01) | |
| *G06Q 50/28* | (2012.01) | |

(52) U.S. Cl.
CPC .......... *G01F 1/007* (2013.01); *G01F 23/0076* (2013.01); *G06Q 50/28* (2013.01)

(58) Field of Classification Search
CPC ... G01F 1/00; G01F 1/007; G01F 5/00; G01F 15/00; G01F 23/00; G01F 23/0076; G06Q 50/28
See application file for complete search history.

(56) References Cited

U.S. PATENT DOCUMENTS

| | | | |
|---|---|---|---|
| 2,628,493 A | 2/1953 | Sandefur | |
| 3,199,199 A | 8/1965 | Harrell et al. | |
| 4,641,139 A | 2/1987 | Edwardsson | |
| 4,827,762 A * | 5/1989 | Hasselmann | ........... G01F 1/007 702/51 |
| 5,351,725 A | 10/1994 | Suthergreen et al. | |
| 5,423,457 A | 6/1995 | Nicholas et al. | |
| 5,438,867 A | 8/1995 | van der Pol | |
| 5,614,831 A | 3/1997 | Edvardsson | |
| 5,922,969 A | 7/1999 | Haar | |
| 6,006,605 A | 12/1999 | Sulollari | |
| 6,107,957 A | 8/2000 | Cramer et al. | |
| 6,300,897 B1 | 10/2001 | Kielb | |
| 6,353,407 B1 | 3/2002 | Donnelly | |
| 6,538,261 B1 | 3/2003 | McConnel et al. | |
| 6,871,540 B2 | 3/2005 | Barlian et al. | |
| 6,934,644 B2 | 8/2005 | Rogers et al. | |
| 7,319,401 B2 | 1/2008 | Akerstrom et al. | |
| 7,408,501 B2 | 8/2008 | Rolfes et al. | |
| 7,441,455 B2 | 10/2008 | Vargas Da Silva | |

(Continued)

*Primary Examiner* — Nguyen Q. Ha
(74) *Attorney, Agent, or Firm* — Hall Estill Attorneys at Law; Tyler Mantooth

(57) ABSTRACT

The fluid in a vessel can be monitored in real-time by a system that consists of at least a level module positioned proximal a vessel. The level module may be connected to a first sensor and a second sensor that are each attached to the vessel and responsive to changes in fluid within the vessel. The level module can employ a stored log of sensor measurements to provide a real-time volume of fluid within the vessel while fluid is flowing into or out of the vessel.

19 Claims, 3 Drawing Sheets

(56) References Cited

U.S. PATENT DOCUMENTS

| | | | | |
|---|---|---|---|---|
| 7,470,060 B1* | 12/2008 | Hoben | .................... | G01F 9/001 |
| | | | | 340/870.16 |
| 7,701,385 B2 | 4/2010 | Edvardsson | | |
| 9,103,736 B2 | 8/2015 | Chen et al. | | |
| 9,476,743 B1* | 10/2016 | Westmoreland | .......... | G01F 1/34 |
| 2010/0139392 A1* | 6/2010 | Kumar | .................... | F22B 35/00 |
| | | | | 73/290 R |
| 2010/0241063 A1* | 9/2010 | Straessler | .............. | G01N 11/08 |
| | | | | 604/66 |
| 2014/0109667 A1* | 4/2014 | White | .................... | G01F 23/243 |
| | | | | 73/304 C |
| 2017/0184138 A1* | 6/2017 | Smith | .................... | G01F 23/00 |
| 2018/0008787 A1* | 1/2018 | Schriver | ............. | A61M 5/2066 |

* cited by examiner

REAL-TIME VESSEL MONITORING SYSTEM

RELATED APPLICATION

The present application makes a claim of domestic priority under 35 U.S.C. 119(e) to U.S. Provisional Patent Application No. 62/500,575 filed May 3, 2017, the contents of which are hereby incorporated by reference.

SUMMARY

A vessel monitoring system, in accordance with some embodiments, has a level module positioned proximal a vessel and connected to a first sensor and a second sensor. Each sensor is responsive to changes in fluid within the vessel so that the level module can calculate a real-time volume of fluid within the vessel while fluid is flowing into or out of the vessel.

In other embodiments, a vessel monitoring system activates a level module positioned proximal a vessel and connected to a first sensor and a second sensor. Each sensor is responsive to changes in fluid within the vessel to allow the level module to predict at least one fluid condition with the level module and then calculate a real-time fluid condition within the vessel based on measurements from the first and second sensors while fluid is flowing into or out of the vessel in response to the at least one fluid condition predicted by the level module.

Activation of a level module positioned proximal a vessel and connected to a first sensor and a second sensor that are responsive to changes in fluid within the vessel allows the level module to predict at least one fluid condition with the level module and then calculate a real-time fluid condition within the vessel based on measurements from the first and second sensors while fluid is flowing into or out of the vessel with the predicted fluid condition being responsive to the at least one fluid condition predicted by the level module. The tank level then computes a production volume from an upstream fluid producing entity responsive to the real-time fluid condition.

DETAILED DESCRIPTION

Vessels of assorted shapes and sizes have been used by numerous different industries to hold and transfer fluids temporarily and permanently. While many tools can be employed to measure the amount of fluid stored within a vessel, accurate readings have required the vessel to be "shut in" by ceasing any flow of fluid into, or out of, the vessel for a predetermined amount of time. Such fluid flow stoppage can impede fluid generation and delivery. Hence, various embodiments of the present disclosure are generally directed to a vessel monitoring system that can provide the volume of fluid in a vessel in real-time while fluid is transferred to, or from, the vessel.

In other words, various embodiments monitor in real-time the amount of fluid coming into a vessel and leaving a vessel simultaneously using a single computing device having a level module. Any number and type of sensor can be concurrently employed by the level module, such as a float, magnetostrictive, ultrasonic, radar, and laser sensors. While such sensors may measure the location of fluid within a vessel at a given time, they do not have the ability to account for a fluid transfer gradient that can result in fluid movement in the vessel and inaccurate fluid volume readings from simple level indicators alone. As a result, no acceptable means for proving fluid production or injection rates currently exist.

Accordingly, a vessel monitoring system, in accordance with some embodiments, can correct these issues by taking into account the amount of production occurring before fluid flowed out of the vessel for a set period of time, which is a factor that can change based on the amount of fluid being moved through the vessel.

For a predetermined period, a level module can take the average production per minute over the period and multiply that average by the number of minutes fluid is flowing out of the vessel, which provides an accurate representation of the amount of fluid being produced into the vessel.

The vessel monitoring system can provide optimized accuracy by taking into account the temperature of the fluid in the vessel. A temperature measurement can be used to increase the accuracy of a fluid level reading from one or more sensors as temperature can affect the parameters of the fluid, such as viscosity, which can be difficult to accurately measure, particularly with a float or flow meter. The use of temperature in combination with one or more fluid measurement sensors allows a level module to correctly predict the amount of fluid entering and exiting a vessel simultaneously within a margin of error that is acceptable to any governing body.

Figure 1:
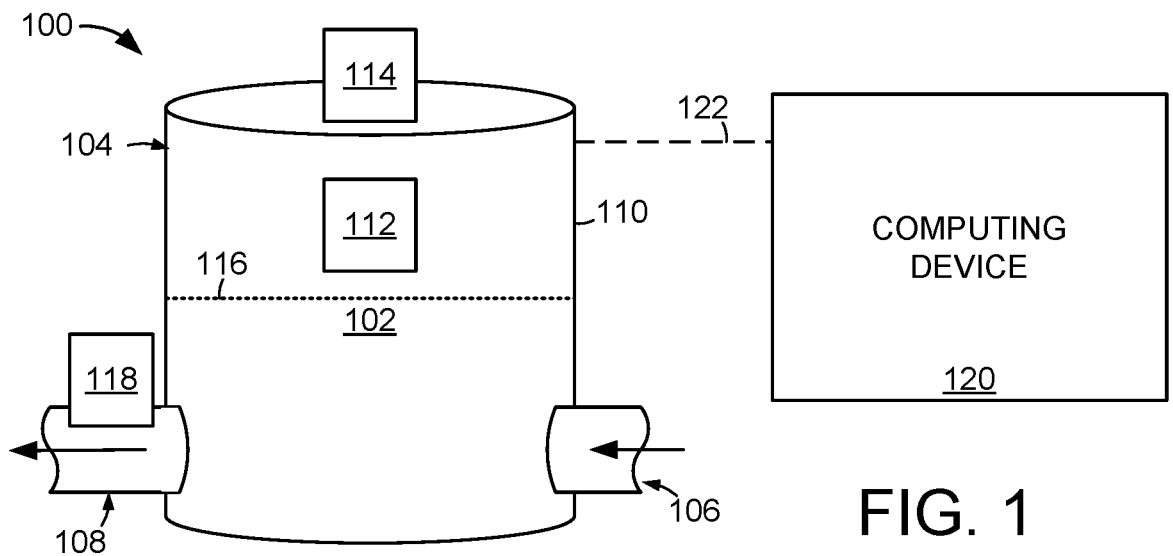
FIG. 1 is a line representation of an example vessel monitoring system where various embodiments of this disclosure can be practiced.

Turning to the drawings, FIG. 1 represents an example vessel monitoring system 100 that is utilize in accordance with various embodiments to provide a real-time measurement of fluid 102 in a vessel 104 while the fluid 102 flows into, or out of, the vessel 104. As shown, a vessel 104 can have one or more inlets 106 and outlets 108 that can transfer the fluid 102 to, and from, the vessel 104 at will. It is contemplated that the vessel 104 can be sealed or unsealed with one or more valves positioned to allow, or prevent the flow of fluid 102 and one or more vents to allow pressure and/or gases to be safely removed from the vessel 104.

Any number and type of sensors can be positioned proximal to the vessel 104 to sense assorted conditions inside the vessel 104. That is, a sensor may be mounted on, within, or separated from the vessel 104 to allow measurement of the fluid 102 contained within the extent of the sidewalls 110 of the vessel 104. As a non-limiting example, a float sensor 112, such as a tank stick, can be positioned on the vessel sidewall 110 while a radar, laser, or ultrasonic sensor 114 is positioned on a top surface of the vessel 104 to concurrently measure the location of the top of the fluid 102, as indicated by segmented line 116. One or more flow meters 118 can be positioned around the tank, inlet 106, and outlet 108 to detect a rate of fluid motion over time.

The various sensors and meters operating with the vessel 104 can collectively be connected to one or more computing devices 120 via a wired or wireless data pathway 122. The computing device 120 can process the data collected by the assorted sensors and meters to provide a real-time volume of fluid 102 in the vessel regardless of if the fluid 102 is moving within, into, or out of the vessel 104. By utilizing the computing power of the computing device 120, the data of the sensors and meters of the monitoring system 100 can be intelligently utilized to compute how much fluid 102 is currently in the vessel 104 as well as how much fluid 104 has flowed into, or out of, the vessel 104 over time, which has practical advantages of fluid measurement efficiency and accuracy compared to vessels that are shut in to measure fluid 102 volumes at different times.

Figure 2:
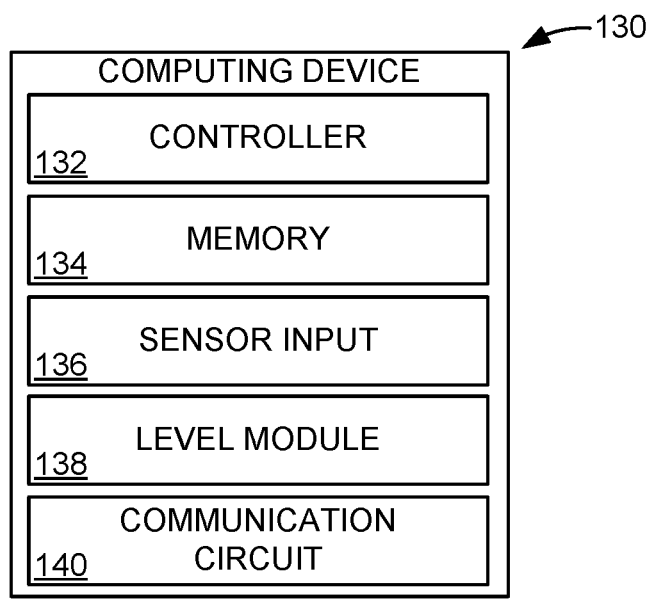
FIG. 2 displays an example computing device capable of being utilized in the vessel monitoring system of FIG. 1 in various embodiments.

FIG. 2 is a block representation of an example computing device 130 that can be employed in the vessel monitoring system 100 of FIG. 1. The computing device 130 can have one or more local controllers 132, which can be a microprocessor, programmable processor, or application specific integrated circuit (ASIC). The local controller 132 can generate, transfer, and alter data via software and firmware stored locally in a non-volatile memory 134. The local memory 134 can store data collected from any number and type of sensor, or meter, via sensor inputs 136.

It is contemplated that different input types are simultaneously accommodated by the sensor inputs 136, such as wireless, serial bus, SCSI, SATA, and other pinned connectors. The data of inputted from the sensors/meters can be processed by the local controller 132 and level module 138 to provide real-time fluid characteristics, such as fluid level, flow rate, and predicted fluid flow over time. Such real-time fluid characteristics can be internally stored in the local memory 134 and/or transmitted to a remote host via a communication circuit 140.

The ability to send measured and computed data to a remote host, such as a server or network node, allows the computing device 130 to have a relatively small physical size and minimal computing that allows the computing device 130 to be positioned anywhere relative to the vessel 104, such as on, near, or far away from the various sensors/meters. It is contemplated that the computing device 130 is a desktop computer, laptop computer, tablet, smartphone, or smartwatch that has capabilities and features beyond those described in FIG. 2.

Figure 3:
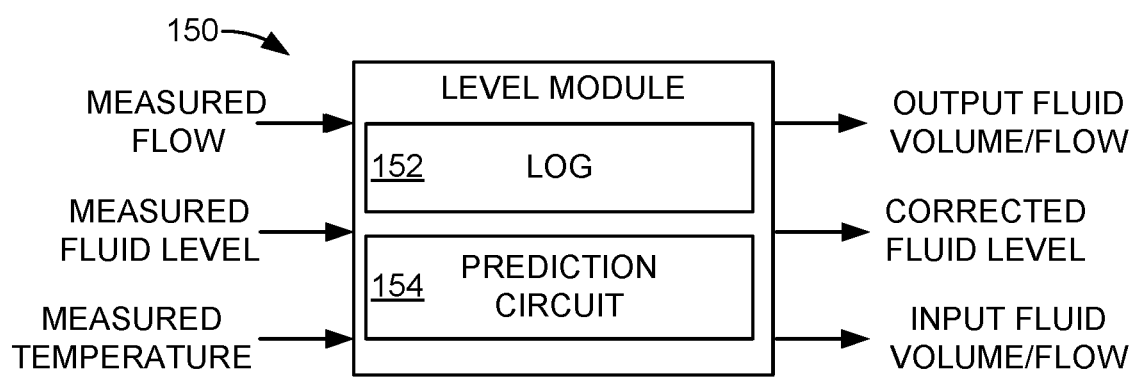
FIG. 3 illustrates an example level module that can be employed in the vessel monitoring system of FIG. 1 in assorted embodiments.

FIG. 3 illustrates an example level module 150 that can be utilized in the vessel monitoring system 100 of FIG. 1 to provide real-time fluid characteristics. The level module 150 can employ the local controller of a computing device to temporarily, or permanently, maintain a log 152 of previously measured fluid parameters. The log 152 can contain, but is not limited to, fluid temperature, tank temperature, level of elevation on a vessel sidewall, inlet flow, outlet flow, and volatility associated with fluid entering or leaving the vessel.

Maintaining the log 152 allows the prediction circuit 154 to interpret past fluid characteristics to predict future fluid characteristics. Such predicted characteristics provides a reference to which current and computed fluid characteristics can be compared, which increases fluid measurement accuracy in real-time. Regardless of whether the log 152 and/or prediction circuit 154 are utilized, the level module 130 can take at least fluid flow, fluid level in the vessel, and temperature measurements to compute at least output fluid volume, output fluid flow, input fluid volume, input fluid flow, and a real-time corrected fluid level within the vessel.

Figure 4:
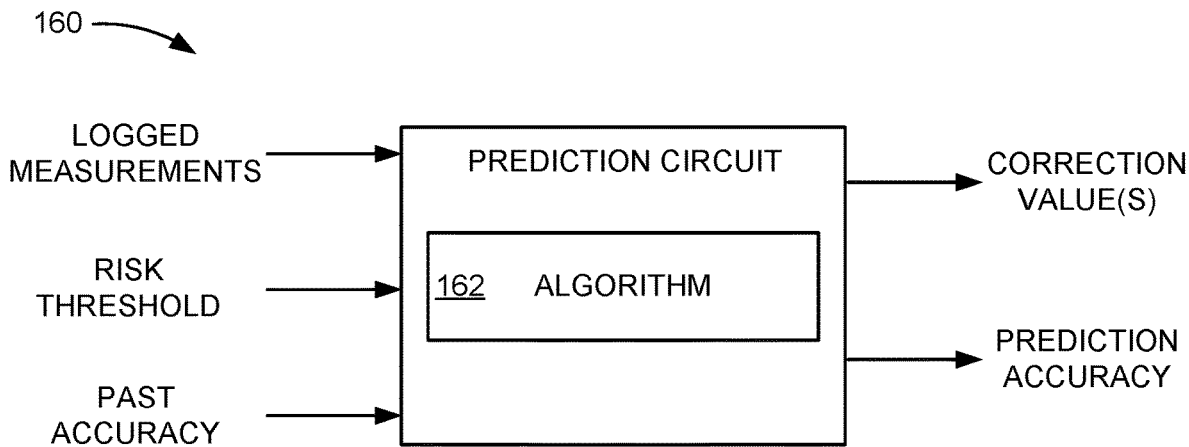
FIG. 4 depicts an example prediction circuit that may be used in the vessel monitoring system of FIG. 1 in some embodiments.

FIG. 4 depicts an example prediction circuit 160 that can operate as part of a level module in accordance with some embodiments to forecast future fluid characteristics based on current, measured fluid conditions and characteristics. The prediction circuit 160 can utilize one or more algorithms 162 stored locally in the same computing device as the level module and prediction circuit 160 or remotely in a memory accessible via a network, such as a cloud computing node.

The prediction circuit 160 can access the log of the level module, as shown in FIG. 3, to input one or more previously recorded fluid and/or vessel measurements. For instance, the prediction circuit 160 can input at least one of a group of fluid temperature, vessel temperature, fluid flow rates, and fluid level in the vessel to compute a correction value that compensates for situational error. That is, the prediction circuit 160 can utilize one or more logged measurements with the algorithm 162 to correlate a previously encountered fluid/vessel situation with a current fluid/vessel situation that results in a correction value to be used to make current fluid measurements more accurate.

While not all current fluid/vessel situations will perfectly match with logged data, the prediction circuit 160 can logically correlate patterns, sequences, and events from the logged measurements that indicate correction values that can increase the accuracy of current measurements. As such, the prediction circuit 160 can compute an amount of risk that a predicted situation will occur and/or the risk that a correction value will increase accuracy of current measurements. In some embodiments, the prediction circuit 160 receives past prediction circuit accuracy amounts and determines if computed correction values are within a host determined risk range, as set by at least one risk threshold.

Figure 5:
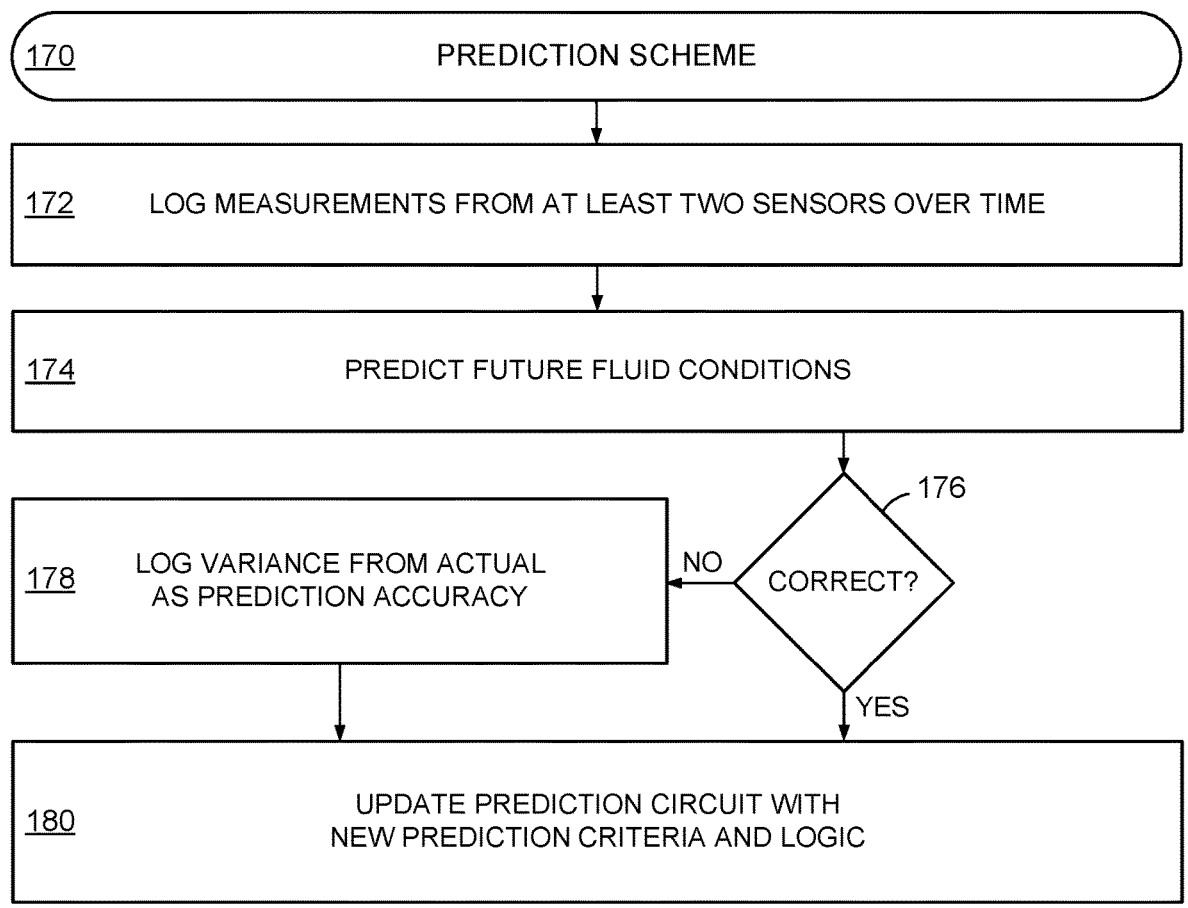
FIG. 5 provides an example prediction scheme that can be carried out by the vessel monitoring system of FIG. 1 in various embodiments.

FIG. 5 conveys an example prediction scheme 170 that may be executed by the vessel monitoring system 100 of FIG. 1 in accordance with assorted embodiments. Measurements from at least two different sensors can be taken and logged by a prediction circuit in step 172, which allows future fluid conditions to be predicted in step 174 with the prediction circuit of a level module. In a non-limiting example, step 172 can utilize a positional sensor, such as radar, ultrasonic, laser, or float, along with a thermistor thermal sensor and a flow meter to log a fluid's rate of transfer to, or from, the vessel, the fluid's temperature, and the location of the surface of the fluid in the vessel.

It can be appreciated that as fluid moves into and out of the vessel, the surface of the fluid will not be uniform height on the sidewall of the vessel as turbulence and changing amounts of fluid disturb at least a portion of the fluid's surface. Hence, measuring the level of the fluid only by detecting the height of a portion of the fluid on a vessel sidewall does not provide a real-time accurate measurement of the volume of fluid in the vessel when fluid is being moved into, or out of, the vessel. Accordingly, the prediction of fluid conditions in step 174 can intelligently utilize the measurements of one or more fluid positional sensors to monitor and analyze how much fluid is in the vessel at any given time, despite fluid flowing and the fluid not having a uniform height within the vessel.

The prediction of fluid conditions in step 174 may progressively be altered as step 172 continuously, or sporadically, logs varying measurements from the dynamic system where fluid is transferring into, or out of, a vessel. At least one predicted condition from step 174 is checked at a later time in decision 176 to determine if the prediction circuit and prediction algorithm(s) are properly utilizing the logged data to forecast future fluid conditions.

If the predicted fluid conditions are not correct, step 178 proceeds to compute and log a prediction accuracy, which is the variance of the predicted condition from the actual condition. That is, a predicted condition may be only slightly incorrect, which would result in a relatively high accuracy while a greatly incorrect predicted condition would result in a relatively low accuracy value. The computed prediction accuracy is then used in step 180 to update the prediction circuit so that future predictions can be more accurate. A prediction circuit is not limited to a particular alteration, but may involve changing, adding, or removing prediction criteria and/or altering a prediction algorithm.

It is noted that changes to the prediction circuit can be generally characterized as altering prediction logic, which is the computational use of the prediction inputs to forecast future fluid events, such as filling or emptying the vessel, and future fluid conditions, such as flow rate, temperature, and level within the vessel. By updating the prediction circuit with accuracy values and results of predictions, future predictions can have improved accuracy.

Figure 6:
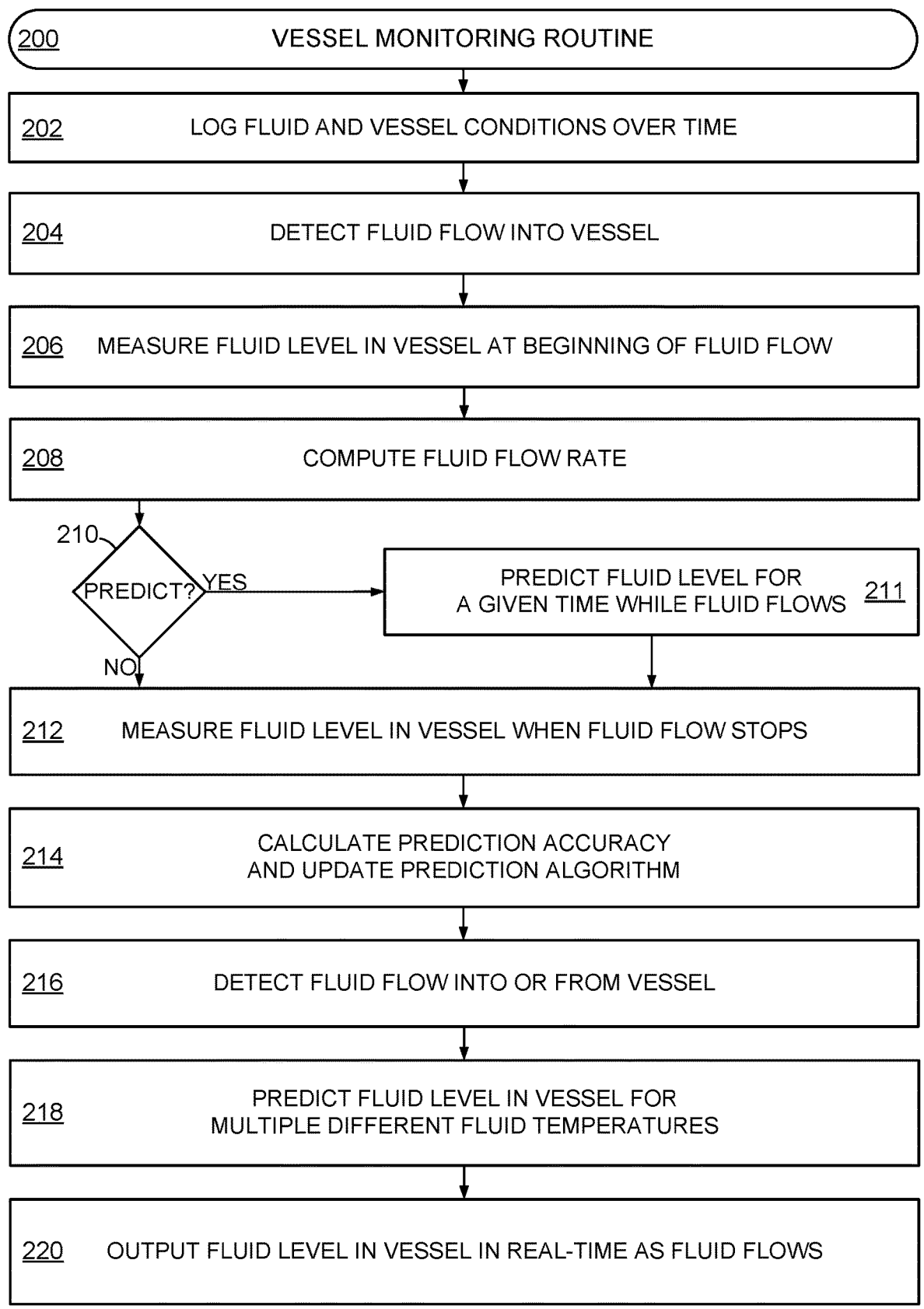
FIG. 6 is an example real-time vessel monitoring routine that is executed by the vessel monitoring system of FIG. 1.

FIG. 6 is an example vessel monitoring routine 200 that is executed by the vessel monitoring system 100 of FIG. 1 and may be carried out with the prediction scheme 170 of FIG. 5 in various embodiments. Step 202 begins by logging fluid and vessel conditions over time. It is contemplated that multiple sensors can concurrently, or sequentially, are utilized to measure multiple different conditions for either a fluid, such as oil, crude, water, acid, base, or other liquid, or for a vessel, such as a sealed or unsealed tank, but some embodiments concurrently measure and log multiple different conditions for both the fluid and the vessel in which the fluid is travelling to, or from.

The logged conditions in step 202 can be stored in the memory of a computing device for any amount of time before the flow of fluid into, or out of, the vessel is detected in step 204. When fluid flow is initially detected, such as by a flow meter, acoustic sensor, or electronic indication of upstream fluid transfer, step 206 measures the level of fluid in the vessel. It is noted that the measurement of step 206 can activate more than one different type of sensor prior fluid entering the vessel and disturbing the uniform fluid level in the tank. That is, step 206 can be performed when the fluid level in the tank is uniform throughout the interior of the vessel.

Next, step 208 computes an actual, or derivative, fluid flow rate into, or out of, the vessel. In other words, the fluid flow rate of step 208 can be measured directly from a flow sensor or derived from other measured parameters, such as volume, weight, and velocity. The fluid flow rate allows the prediction circuit of a level module of a computing device to predict a fluid level in the vessel for a given time while fluid flows into, or out of, the vessel. For example, decision 210 can predict multiple different fluid levels in response to the measured fluid level from step 206, the flow rate from step 208, and the fluid/vessel conditions logged in step 202. The predicted fluid level(s) resulting from decision 210 can involve multiple predicted parameters, such as fluid temperature, volume in the vessel, and fluid level as measured as height on the sidewall of the vessel.

When the fluid flow stops and the fluid in the vessel comes to a rest where the fluid surface is uniform throughout the vessel, step 212 measures the fluid level in the vessel to determine how much fluid has entered, or exited, the vessel. The actual resulting fluid level from step 212 is compared to the predicted fluid level from step 210 to calculate the accuracy of the prediction in step 214. It is contemplated that step 214 then updates the prediction algorithm, and/or the prediction logic, to improve future predictions.

It is noted that the routine 200 can end, or cycle back to step 202, after step 214 for any amount of time or any number of cycles. In some embodiments, the routine 200 subsequently detects a new fluid flow into or from the vessel in step 216. With the prediction accuracy improved via steps 204-214, step 218 can predict the fluid level in the vessel for multiple different fluid temperatures over time. The prediction of step 218 may, or may not, measure the position of the fluid surface in the vessel and any measurements assume fluid turbulence and a non-uniform level within the vessel due to the flow of fluid.

The predicted fluid level in the vessel is then outputted to a host in real-time as fluid continues to flow. The outputted fluid level can accompany an accuracy value that corresponds with a percentage risk that the predicted level is not accurate. The outputted fluid level may also consist of a tolerance, or correction, value that provides the host a range within a predetermined confidence interval, such as greater then 95%. The ability to accurately predict the fluid level for multiple temperatures over time in step 218 allows a computing device to provide a predicted volume of fluid being produced, or expelled, during fluid transfer, which can aid numerous industries that previously would have to shut in the vessel and measure actual fluid levels to determine fluid volume inside, or removed from, the vessel.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed.

What is claimed is:

1. An apparatus comprising a level module positioned proximal a vessel, the level module connected to a first sensor and a second sensor each responsive to changes in fluid within the vessel, the level module configured to calculate a real-time volume of fluid within the vessel while fluid is flowing into or out of the vessel in response to at least one fluid condition predicted by the level module and compute an accuracy percentage of the real-time fluid condition from the at least one fluid condition.

2. The apparatus of claim 1, wherein the first and second sensors are each attached to the vessel.

3. The apparatus of claim 1, wherein the level module stores a log of measurements from at least the first sensor in a local memory of a computing device where the level module is resident.

4. The apparatus of claim 1, wherein the first sensor is a temperature sensor.

5. The apparatus of claim 1, wherein the second sensor is a flow rate sensor.

6. The apparatus of claim 1, wherein the first and second sensors are different and physically separate.

7. The apparatus of claim 1, wherein the level module receives measured fluid flow into the vessel, measured fluid flow out of the vessel, measured fluid level within the vessel, and measured temperature.

8. The apparatus of claim 1, wherein the level module calculates a corrected fluid level within the vessel.

9. The apparatus of claim 1, wherein the level module calculates a corrected fluid flow value.

10. A method comprising:

activating a level module positioned proximal a vessel, the level module connected to a first sensor and a second sensor each responsive to changes in fluid within the vessel, predicting at least one fluid condition with the level module;

calculating a real-time fluid condition within the vessel based on measurements from the first and second sensors while fluid is flowing into or out of the vessel in response to the at least one fluid condition predicted by the level module; and computing an accuracy percentage of the real-time fluid condition from the at least one fluid condition.

11. The method of claim 10, wherein the prediction of at least one fluid condition is based on measurements logged by the level module for the vessel.

12. The method of claim 10, wherein the prediction of at least one fluid condition tested against a risk threshold.

13. The method of claim 12, wherein the risk threshold is a percentage chance of a previously logged event happening.

14. The method of claim 10, wherein the level module logs a variance between the predicted at least one fluid condition and the real-time fluid condition.

15. The method of claim 10, wherein the prediction of at least one fluid condition involves matching a pattern of detected fluid conditions within the vessel.

16. A method comprising:

activating a level module positioned proximal a vessel, the level module connected to a first sensor and a second sensor each responsive to changes in fluid within the vessel, predicting at least one fluid condition with the level module;

calculating a real-time fluid condition within the vessel based on measurements from the first and second sensors while fluid is flowing into or out of the vessel in response to the at least one fluid condition predicted by the level module;

computing an accuracy percentage of the real-time fluid condition from the at least one fluid condition; and computing a production volume from an upstream fluid producing entity with the level module.

17. The method of claim 16, wherein the at least one fluid condition is a volume of fluid within the vessel.

18. The method of claim 16, wherein the level module concurrently activates the first and second sensors to calculate the real-time fluid condition.

19. The method of claim 16, wherein the calculated real-time fluid condition is different than a real-time measurement of the first sensor.

\* \* \* \* \*